United States Patent [19]

Togashi

[11] Patent Number: 4,513,220

[45] Date of Patent: Apr. 23, 1985

[54] IGNITION PLUG WITH AIR PASSAGE AND DOUBLE CHECK VALVE

[76] Inventor: Mokichi Togashi, 16-10, Okudo 2-chome, Katsushika-ku, Tokyo, Japan

[21] Appl. No.: 417,168

[22] Filed: Sep. 13, 1982

[51] Int. Cl.[3] .......................... H01T 13/02; F16K 15/00

[52] U.S. Cl. .......................... 313/120; 137/512

[58] Field of Search .......................... 313/120; 137/512 (U.S. only), 512.3 (U.S. only)

[56] References Cited

U.S. PATENT DOCUMENTS

| | | | |
|---|---|---|---|
| 2,059,257 | 11/1936 | Letterman | 313/120 X |
| 2,903,014 | 9/1959 | Sheppard | 137/512 X |
| 3,043,281 | 7/1962 | Candelise | 313/120 X |
| 4,139,469 | 2/1979 | Rainin et al. | 137/512 X |
| 4,282,897 | 8/1981 | De Mey | 137/512 |
| 4,392,507 | 7/1983 | Harris | 137/512.3 X |

FOREIGN PATENT DOCUMENTS

| | | | |
|---|---|---|---|
| 245055 | 6/1926 | United Kingdom | 313/120 |

*Primary Examiner*—Palmer Demeo

*Attorney, Agent, or Firm*—Birch, Stewart, Kolasch & Birch

[57] ABSTRACT

An ignition plug provided with a tubular center electrode through which open air is introduced into the engine cylinder to accelerate exhaust of the combustion gas from the cylinder in the exhaust stroke of an engine cycle. The tubular electrode has a double-check valve fitted therein to prevent leakage of the high-pressure gas from the cylinder when the cylinder pressure is above the ambient pressure. The valve is composed of two differently-weighted floats serially disposed in the center electrode, one of the floats being in operative position even if the other resonates with engine vibration.

5 Claims, 3 Drawing Figures

IGNITION PLUG WITH AIR PASSAGE AND DOUBLE CHECK VALVE

BACKGROUND AND SUMMARY OF THE INVENTION

The present invention relates to an ignition plug for use in an automobile engine, and more particularly to a plug of the type having an air passage adapted to introduce auxiliary air into the engine cylinder during the exhaust stroke of an engine cycle to accelerate the exhaust of combustion gas.

An ignition plug with an air passage is known by Japanese Published Unexamined Patent Applications (Kokai Tokkyo Koho) Nos. 53-70233 and 55-84868, in which open air is introduced into the engine cylinder through a radial hole formed in the plug to accelerate the exhaust of combustion gas and prohibit the same from remaining in the cylinder. The auxiliary air, as introduced by the plug, is effective to improve combustion efficiency, reduce fuel consumption, and relieve exhaust-gas troubles.

The known plug has a radial hole as an air passage extending from the inlet in the outer periphery of the housing to the outlet which opens to a void space between the inner periphery of the housing and the outer periphery of the insulator. However, this leads to disadvantages, one of which is that the plug can not be formed with such an air passage without changing its fitting dimensions from a standard plug. Another disadvantage is that the radial hole readily becomes choked by dust because of having its inlet near the dusty surface of the cylinder head. The radial hole is too short to have a double-check valve or a similar lengthwise valve for overcoming engine vibrations.

In accordance with the present invention which is intended to provide a remedy for the disadvantages in the known plug as described above, the inventive plug comprises a tubular center electrode and a tubular terminal forming an air passage through the axes thereof and a check valve mounted in the center electrode to close the air passage when an inside pressure is above the open-air pressure and open the air passage when it is below the open-air pressure. The plug is somewhat different from a standard one in the center electrode and the terminal but is the same in its fitting dimensions as the standard plugs. The air passage has its inlet so separated from the cylinder head as to be unaffected by dust on the cylinder head and is long enough to contain a double-check valve that is resistible to engine vibrations.

It is an object of the invention to provide an improved ignition plug with an air passage which has the same fitting dimensions as a standard plugs.

It is another object of the invention to provide an improved ignition plug with an air passage which is unaffected by dust on the cylinder head.

It is a further object of the invention to provide an improved ignition plug with an air passage containing a check valve which resists engine vibrations.

For an understanding of the principles of the invention, reference is made to the following description of typical embodiments thereof as illustrated in the accompanying drawing.

DESCRIPTION OF THE PREFERRED EMBODIMENTS

Figure 1:
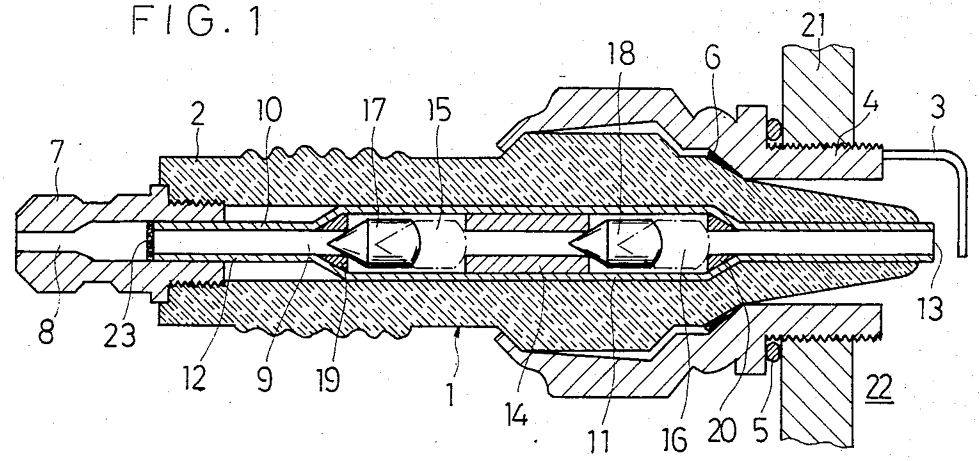
FIG. 1 is a longitudinal section of the ignition plug of the invention.

As seen in FIG. 1, the ignition plug 1 is composed of an insulator 2 of aluminous porcelain, a ground electrode 3, a housing 4 of steel, a terminal 7 of electroconductive material, and a center electrode 10. The ignition plug 1 is secured to the cylinder head 21 of an engine cylinder 22 with the intervention of a gasket 5. The ground electrode 3 of heat-resistant metal is fixedly attached to the housing 4, which is fitted on the insulator 2 with the intervention of sealants 6. All the parts except the terminal 7 and the center electrode 10 are of the same size and shape as those of the standard plug. The terminal 7 differs from the standard one in having a center bore 8, so that the standard terminal is easily modified to the inventive one by machining the center bore. The center electrode 10 has a tubular air passage 9 formed therein. The opposite portions 12, 13 of the center electrode 10 are diametrically similar to the standard center electrode, and the middle portion 11 is diametrically larger than the standard one and similar to the rear hollow portion of the insulator 2. The air passage 9 in the middle portion 11 is divided into two valve spaces 15, 16 by a tubular partition 14 to form a double-check valve. The valve spaces 15, 16 contain the respective conically shaped floats 17, 18 which are similar in size but different in weight from each other. Therefore, both of the floats 17, 18 differ in natural frequency. A filter 23 is removably fitted in the center bore 8 of the terminal 7 behind the rear end of the center electrode 10. The floats 17 and 18 have a cylindrical configuration with a cone-shaped end portion.

Figure 2:
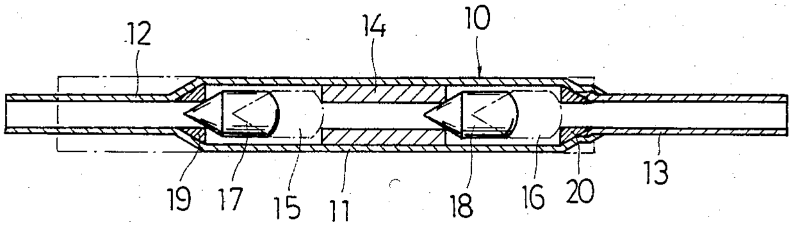
FIG. 2 is a longitudinal section of the center electrode of FIG. 1.

As seen in FIG. 2, the middle and rear portions 11, 12 of the center electrode 10 are made of a single copper tube shown by dotted lines and the front portion 13 is mostly made of a heat-resistant tube of nickel alloy. The copper tube has its outer diameter equal to the inner diameter of the rear hollow portion of the insulator 2 and its inner diameter similar to the outer diameter of the tubular partition 14. The center electrode 10 is provided to have a double-check valve as follows: After the tubular partition 14, both of the conical floats 17, 18 with outwardly facing apexes, and two opposite conical washers 19, 20 are inserted into the copper tube. The copper tube has the opposite portions thinly drawn to form the rear portion 12 and the root of the front portion 13 of the center electrode 10. The unworked portion remains as the middle portion 11 of the center electrode 10 in which two valve spaces 15, 16 are serially connected to constitute a double-check valve together with the tubular partition 14, the two valve floats 17, 18 and the two conical washers 19, 20. The thinly worked front end of the copper tube is fixedly connected with the rear end of the nickel alloy tube to form the front portion 13 of the center electrode 10. The original bores of the copper tube and the nickel alloy tube remain as the air passage 9.

The center electrode 10 is coaxially inserted in the insulator 2 and connected with the terminal 7, which is tightly screwed in the rear portion of the insulator 2, as seen in FIG. 1. The housing 4 and the insulator 2 are previously assembled. The ignition plug 1 is completed after the filter 23 is inserted in the center bore 8 of the terminal 7.

Figure 3:
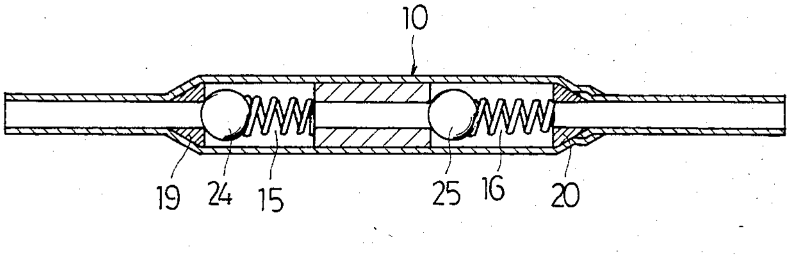
FIG. 3 is a view, similar to FIG. 2, of another embodiment.

As seen in FIG. 3, spring-biased balls 24, 25 can replace the floats 17, 18 of FIGS. 1 and 2. The spring-biased balls 24, 25 are so different from each other in modulus of elasticity that one of them always remains uninfluenced by engine vibrations even if the other resonates. The conical washers 19, 20 are provided to reinforce the valve spaces 15, 16, but may be eliminated if the center electrode 10 is made of a strong tube.

In operation, a gasoline-air mixture is compressed in the compression stroke of an engine cycle to a high pressure, which presses the valve float 18 against the partition 14 and close the air passage 9. Also, the air passage remains closed during the succeeding expansion stroke, so that the high pressure gas cannot leak through the air passage 9 in both compression and expansion strokes.

In the exhaust stroke, in which the cylinder pressure is relatively negative, open air, after being cleaned by the filter 23, pushes the valve floats 17, 18 and enters the cylinder 22 through the air passage 9. The air accelerates the exhaust of combustion gas from the cylinder 22 and prevents the same from staying in the cylinder with the result that the newly drawn in gasoline-air mixture is maintained uncontaminated by the combustion gas in the suction stroke. This contributes to a normal combustion in each cycle, which reduces problems in the exhaust gas and noise due to incomplete combustion and saves fuel.

Even if one of the floats 17, 18 resonates with engine vibration, the other remains unaffected to reliably close the air passage 9 when the cylinder pressure is above atmospheric pressure and open the air passage when the cylinder pressure is below atmospheric pressure, because both floats 17, 18 differs in their vibrational property due to their difference in weight. The double-check valve provided with the valve floats 17, 18 seldom permits leakage of high pressure gas from the cylinder 22. The air passage 9 has its inlet in the terminal 7 projecting from the cylinder head 21 and is kept clean without suffering from dust on the cylinder head 21.

From the foregoing, it can be seen that the ignition plug of the invention is substantially similar to a standard plug except with respect to the center electrode which is also manufactured from a copper tube and a heat-resistant nickel alloy tube. This means that the standard plug is easily modified to the inventive plug by replacement of the center electrode.

It should be understood that the foregoing disclosure relates only to presently preferred embodiments, and that it is intended to cover all changes and modifications of the examples of the invention herein chosen for the purpose of the disclosure which do not constitute departures from the spirit and scope of the invention set forth in the appended claims.

What is claimed is:

1. An ignition plug having one end thereof leading to the engine cylinder and the other end thereof leading to ambient air which comprises a housing adapted to be secured to the engine cylinder, an insulator inserted in said housing, said insulator having a central bore, a tubular center electrode having an air passage extending therethrough, said electrode being disposed within the central bore of the insulator, said tubular electrode having a middle portion of enlarged cross-section for housing a check valve therein, said check valve including a tubular partition disposed within said middle portion for internally dividing said middle portion into two valve spaces, said tubular partition containing a central aperture therein to provide communication between said valve spaces, a float member disposed in each of said valve spaces for selectively opening and closing said valve spaces to the engine cylinder or ambient air, said float member having a cylindrical configuration with a cone shaped end portion, and a terminal element fixed to the rear portion of the insulator and connected to the center electrode, said terminal element also containing a central bore for connecting the air passage of the center electrode with ambient air, whereby when the pressure in the engine cylinder is higher than ambient air pressure, the check valve closes the air passage to ambient air, and when the pressure in the engine cylinder is lower than ambient air pressure, the check valve opens the air passage to ambient air.

2. The ignition plug as claimed in claim 1, wherein, said valve floats are different from each other in weight.

3. The ignition plug as claimed in claim 1, wherein said valve spaces contain spring-biased floats, said spring-biased floats being different from each other in modulus of elasticity.

4. The ignition plug as claimed in claim 1, wherein said valve space is reinforced by a conical washer.

5. The ignition plug as claimed in claim 1, wherein said check valve is of the double-check valve type.

* * * * *